United States Patent
Haney et al.

(10) Patent No.: US 10,378,962 B2
(45) Date of Patent: Aug. 13, 2019

(54) NON-CONTACT MEASUREMENT OF MULTI-TEMPERATURE PROFILE OF AN OBJECT

(71) Applicant: The Boeing Company, Chicago, IL (US)

(72) Inventors: Ricky Lance Haney, St. Peters, MO (US); Loyal Bruce Shawgo, O'Fallon, WA (US); Mark David Rogers, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 393 days.

(21) Appl. No.: 14/251,490

(22) Filed: Apr. 11, 2014

(65) Prior Publication Data
US 2015/0292950 A1 Oct. 15, 2015

(51) Int. Cl.
*G01J 3/443* (2006.01)
*G01J 5/60* (2006.01)
*G01J 5/52* (2006.01)
*G01J 5/00* (2006.01)

(52) U.S. Cl.
CPC .............. *G01J 5/602* (2013.01); *G01J 5/52* (2013.01); *G01J 2005/0085* (2013.01)

(58) Field of Classification Search
CPC ....... G01J 5/34; G01J 5/20; G01J 5/02; H01L 37/02; G08B 13/191
See application file for complete search history.

(56) References Cited

U.S. PATENT DOCUMENTS

| | | | |
|---|---|---|---|
| 5,561,523 A | 10/1996 | Blomberg et al. | |
| 6,379,038 B1 * | 4/2002 | Felice | G01J 5/60 374/126 |
| 7,891,866 B2 * | 2/2011 | Rogers et al. | 374/120 |
| 2007/0118324 A1 * | 5/2007 | Gulati | 702/131 |
| 2015/0124244 A1 * | 5/2015 | Earl | G01J 5/0862 356/43 |

OTHER PUBLICATIONS

Felipe G. Nogueira, Daniel Felps, and Ricardo Gutierrez-Osuna, Development of an Infrared Absorption Spectroscope Based on Linear Variable filters, IEEE Sensors Journal, vol. 7, No. 8, Aug. 2007.
H. Madura, M. Kastek, T. Piatkowski, Automatic compensation of emissivity in three-wavelength pyrometers, Infrared Physics & Technology 51 (2007) 1- 8.
R. L. Byer and C. B. Roundy, Pyroelectric coefficient direct measurement technique and application to a nsec response time detector, IEEE Trans. Sonics & Ultrasonics, 1972, SU-19, pp. 333-338.

* cited by examiner

*Primary Examiner* — David P Porta
*Assistant Examiner* — Mamadou Faye
(74) *Attorney, Agent, or Firm* — Miller, Matthias & Hull LLP

(57) ABSTRACT

A method involves determining multiple temperatures of an object from spectral data collected from the object. The spectral data covers a plurality of wavelengths. The method comprises using a computer to (a) assign an initial value for residual radiation; (b) identify a black body profile that best fits the spectral data over the plurality of wavelengths; (c) remove radiation corresponding to the identified profile from the residual radiation; and (d) return to (b) until the residual radiation reaches a termination criterion.

18 Claims, 4 Drawing Sheets

NON-CONTACT MEASUREMENT OF MULTI-TEMPERATURE PROFILE OF AN OBJECT

BACKGROUND

A pyrometer may be used to measure temperature of an object without making physical contact with the object. For instance, radiation from an object may be focused onto a detector, whose output is related to irradiance of the object. The temperature of the object may be inferred from the measured irradiance and known emissivity of the object.

A multi-spectral pyrometer eliminates the need to know the emissivity of an object. Temperature measurements by a multi-spectral pyrometer are based on a gray body assumption whereby emissivity at different wavelengths is assumed to be constant. However, the gray body assumption is not valid for metals and other materials that do not have the same emissivity at two different wavelengths, thus leading to erroneous results if used to measure a multi-temperature profile.

Consider the example of low emissivity glass manufacturing, where different grades of low emissivity glass have very low, yet different, emissivity values. These emissivity values may not be known, especially at their respective processing temperatures. A multi-spectral pyrometer would produce an erroneous profile.

SUMMARY

According to an embodiment herein, a method involves determining multiple temperatures of an object from spectral data collected from the object. The spectral data covers a plurality of wavelengths. The method comprises using a computer to (a) assign an initial value for residual radiation; (b) identify a black body profile that best fits the spectral data over the plurality of wavelengths; (c) remove radiation corresponding to the identified profile from the residual radiation; and (d) return to (b) until the residual radiation reaches a termination criterion.

According to another embodiment herein, a method of determining multiple temperatures of an object from spectral data covering a plurality of wavelengths comprises using a computer to set residual radiation to total radiation in the spectral data; compute a black body profile for each of a plurality of temperatures for each one of the wavelengths; select one of the profiles that best fits the spectral data; infer a temperature from the selected profile; and remove radiation contributed by the selected profile from the residual radiation. Control is returned to computing another black body profile for each of a new plurality of temperatures. The new plurality doesn't include any inferred temperature.

According to another embodiment herein, an apparatus comprises at least one thermal sensor for capturing spectral data over a plurality of wavelengths, and a processor programmed to assign an initial value for residual radiation; identify a black body profile that best fits the spectral data over the plurality of wavelengths; remove radiation corresponding to the identified profile from the residual radiation; and return to identifying a black body profile for another temperature until the residual radiation reaches a termination criteria.

These features and functions may be achieved independently in various embodiments or may be combined in other embodiments. Further details of the embodiments can be seen with reference to the following description and drawings.

DETAILED DESCRIPTION

Figure 1:
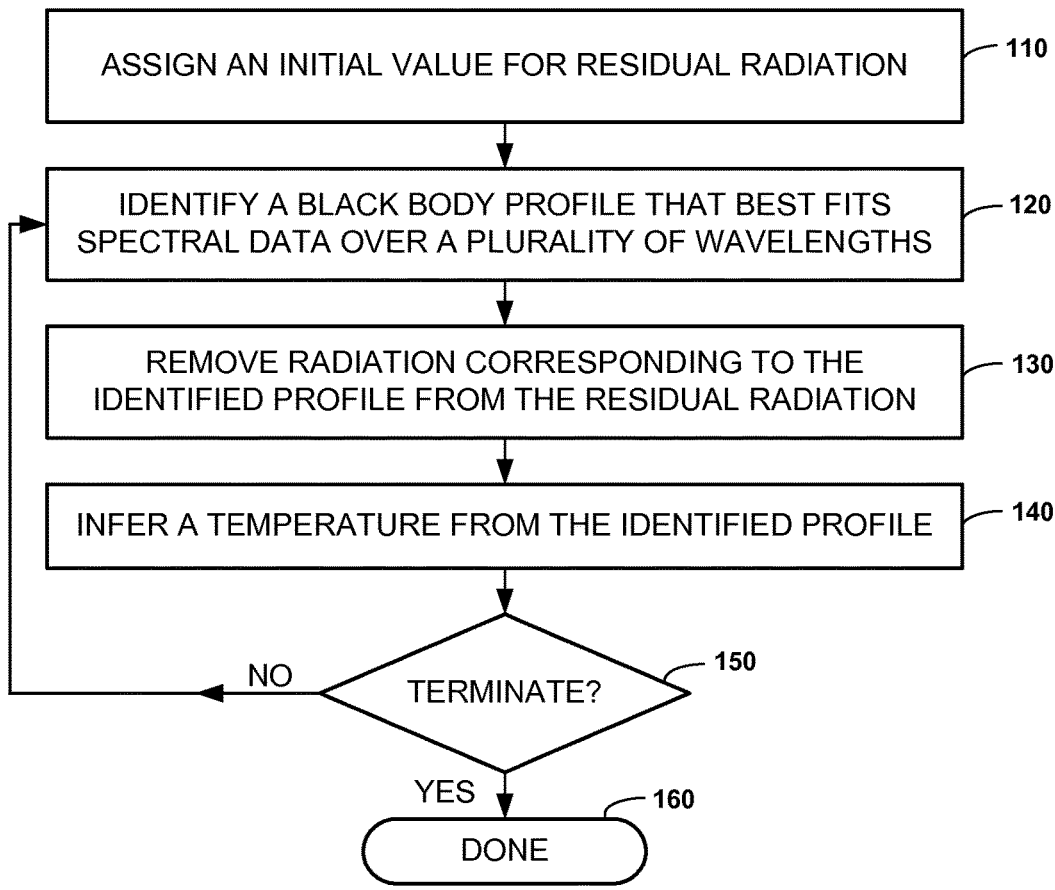
FIG. 1 is an illustration of a method of determining multiple temperatures of an object.

Reference is made to FIG. 1, which illustrates a method of determining multiple temperatures of an object from spectral data collected from a spot on the object. The spectral data is collected by one or more sensors that are sensitive to a plurality of wavelengths. Therefore, the collected spectral data may cover a plurality of wavelengths.

At block 110, an initial value for residual radiation is assigned. For example, the residual radiation may be set equal to the total radiation collected by the sensors.

At block 120, a black body radiation profile that best fits the spectral data over the plurality of wavelengths is identified. A black body radiation profile, as used in this application, refers to an emitted radiation profile according to Plank's law, where an ideal emitter (a black body) has emissivity of 1 and a non-ideal emitter (gray body) has an emissivity of less than 1. That is, the black body profile as used in this application covers black body radiation and gray body radiation.

At block 130, a temperature of the object may be inferred from the identified profile. That temperature is considered to be one of the temperatures of the object.

At block 140, radiation corresponding to the identified profile is removed from the residual radiation. For instance, if the profile indicates spectral radiance per unit area, then the radiation to be removed is a product of the spectral radiance per unit area and an area-emissivity factor.

At block 150, a termination criterion is tested. If the residual radiation does not satisfy the termination criteria (e.g., the residual radiation is above a level of noise), it is assumed that one or more additional temperatures of the object have not yet been identified. Therefore, control is returned to block 120, and another black body profile is identified from the spectral data.

If, however, the termination criterion has been satisfied, then all temperatures of the object are assumed to have been identified, and the method is terminated (block 160). For example, the method is terminated if all that remains in the residual radiation is noise. All saved temperatures may be displayed.

Figure 2:
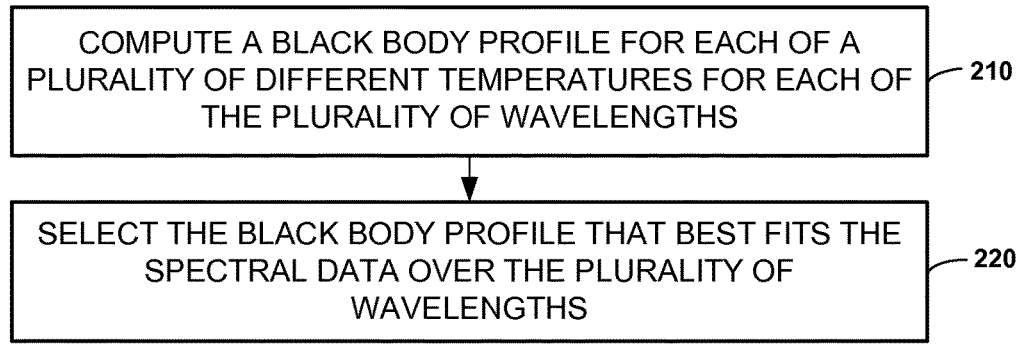
FIG. 2 is an illustration of a method of computing black body power per unit area.

Reference is now made to FIG. 2, which illustrates an example of a method of identifying a black body profile that best fits spectral data over a plurality of wavelengths. At block 210, a black body profile is computed for each of a plurality of different temperatures for each of the plurality of wavelengths. For instance, a first set of profiles is computed for N temperatures at a first wavelength; a $k^{th}$ set of profiles is computed for N temperatures at a $k^{th}$ wavelength; and so on until a last set of profiles is computed for N temperatures at a last wavelength.

At block 220, the black body profile that best fits the spectral data over the plurality of wavelengths is selected. This selection may be made by computing a ratio of residual radiation to black body radiation for each of the temperatures, and then identifying the global minimum of standard deviation of the ratio. The black body profile corresponding to the global minimum is deemed the best fit. The identification of a black body profile that best fits the spectral data is described in greater detail in assignee's U.S. Pat. No. 7,891,866.

Multiple sets of discrete wavelengths improve the accuracy of the calculation. With the method utilizing a statistical approach for selecting black body profiles, accuracy may be increased as the number of wavebands (or discrete wavelengths) increases. The inventors have found that a minimum of ten discrete wavelengths should be considered.

Figure 3:
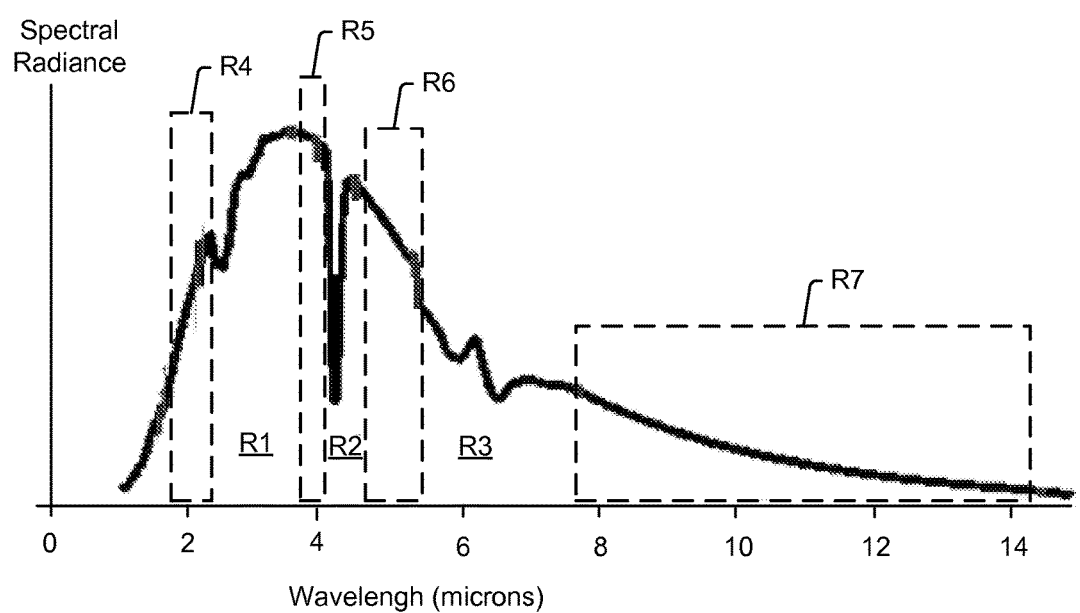
FIG. 3 is an illustration of spectral data covering a plurality of wavelengths, where some of the wavelengths are not useful.

Reference is now made to FIG. 3, which illustrates an example of spectral data covering a plurality of wavelengths. In this example, some of the spectral data might not be useful. Consider the situation where there is strong atmospheric absorption in several regions (R1, R2 and R3) of a spectrum. Those absorption regions (R1, R2 and R3) would not be useful for calculating temperature since they do not look like a black body.

Discrete wavelengths within those absorption regions (R1, R2 and R3) may be excluded from consideration. Thus, black body profiles are not computed at those discrete wavelengths, and the radiation collected at those discrete wavelengths is not added to the total collected radiation. Black body profiles may be computed for some or all of the discrete wavelengths outside of those regions (R1, R2 and R3). That is, black body profiles may be computed for some or all of the wavelengths within regions R4 to R7. For instance, black body profiles are computed for wavelengths at 4, 5, and 8 to 14 microns.

Figure 4:
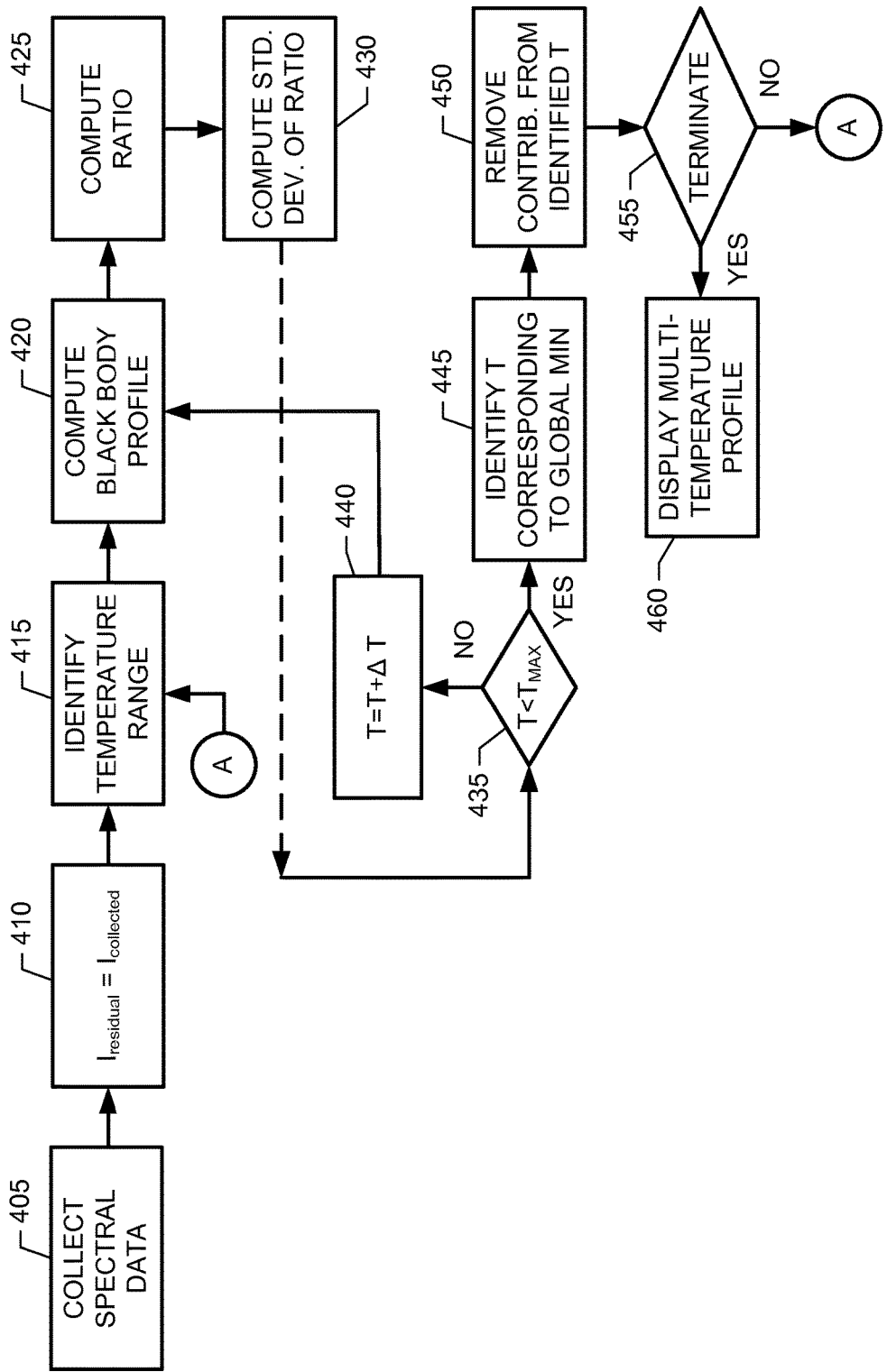
FIG. 4 is an illustration of a method of determining multiple temperatures of an object.

Reference is now made to FIG. 4, which illustrates an example of a method of determining multiple temperatures of an object. At block 405, spectral data is collected from the object. The collection of spectral data is not limited to any particular type or number of sensors, so long as the spectral data covers the requisite wavelengths. In some instances, a single sensor may be capable of detecting radiation over the requisite wavelengths. However, a greater number of sensors and their associated wavelength resolutions may improve accuracy by providing more data samples for the statistical analysis At block 410, residual radiation ($I_{residual}$) is set equal to the total spectral radiation collected by the sensors ($I_{collected}$). Radiation from any non-useful wavelengths is not added to the total collected spectral radiation.

At block 415, a range of temperatures may be identified for each of the wavelengths to be considered. The range may be defined by a maximum temperature (Tmax) and a minimum temperature (Tmin) for each wavelength. The range may exclude those wavelengths that are not useful. Use of the range is more efficient, as it reduces the temperature search space.

At block 420, the black body radiation profile ($I_{BB}$) is computed for the absolute temperature T=Tmin for each wavelength λ. For instance, each black body profile may be computed as follows:

$$I_{BB} = \frac{2\pi hc^2}{\lambda^5} \frac{1}{e^{\frac{hc}{\lambda k_B T}} - 1}$$

where h is the Planck constant, c is the speed of light, and $k_B$ is the Boltzmann constant. Since the profile is for black body radiation, the pattern of the intensity of the radiation over wavelengths depends only on the absolute temperature T.

At block 425, a ratio (r) is computed for each profile as $$r = \frac{I_{residual}}{I_{BB}}.$$

At block 430, a standard deviation ($\sigma_r$) of each ratio (r) is computed. Each standard deviation ($\sigma_r$) represents a variation of the spectral data from the profile of the black body over the set of temperatures. The standard deviation ($\sigma_r$) may be computed as a square root of variance, where variance is the value minus the average quantity squared.

At blocks 435 and 440, the temperature (T) is incremented (T=T+ΔT) and another black body profile ($I_{BB}$), ratio (r) and standard deviation ($\sigma_r$) are computed (according to blocks 420-430) for each wavelength. As a result, additional profiles ($I_{BB}$), ratios (r) and standard deviations ($\sigma_r$) are computed for additional temperatures up to, and including $T_{max}$.

At block 445, the temperature (T) corresponding to a global minimum of ratio standard deviation is identified. This may be done by analyzing first and second derivatives of the ratio standard deviations. Blocks 435 and 440 produce a discrete function of temperature (T) versus standard deviation (σ) for each of the black body profiles. The first derivative may be computed as change in temperature over a change in standard deviation (dT/dσ) and the second derivative may be computed as $dT^2/d\sigma^2$. This temperature corresponding to the global minimum is saved as one of the temperatures of the object.

At block 450, the residual radiation is reduced by removing the contribution from the temperature T found in block 445. For example, the residual radiation may be reduced as follows:

$$I_{residual} = I_{collected} - r(I_{BB}).$$

The residual radiation may be reduced in this manner to ensure that the profile corresponding to the found temperature is properly removed at its given weight (r) within the total intensity spectra that was measured.

At block 455, a termination criterion is tested. For example, if the sum of the residual intensities is greater than a pre-defined percentage of the sum of the collected intensities, then it is assumed that additional temperatures can be found. Therefore, blocks 415-455 are repeated for a different profile, except that profiles are not computed for any of the identified temperatures identified at block 445.

If the termination criterion has been satisfied, then all temperatures are assumed to have been found. At block 460, the temperatures may be displayed.

Thus, a method herein measures multiple temperatures of an object without physical contact of the object. Moreover, the temperatures are measured without knowledge of the object's emissivity and without having to make assumptions about the emissivity.

The method is not limited to collecting data from a single spot on an object. Spectral data may be collected from multiple spots, and the spectral data from each spot may be processed.

Figure 5:
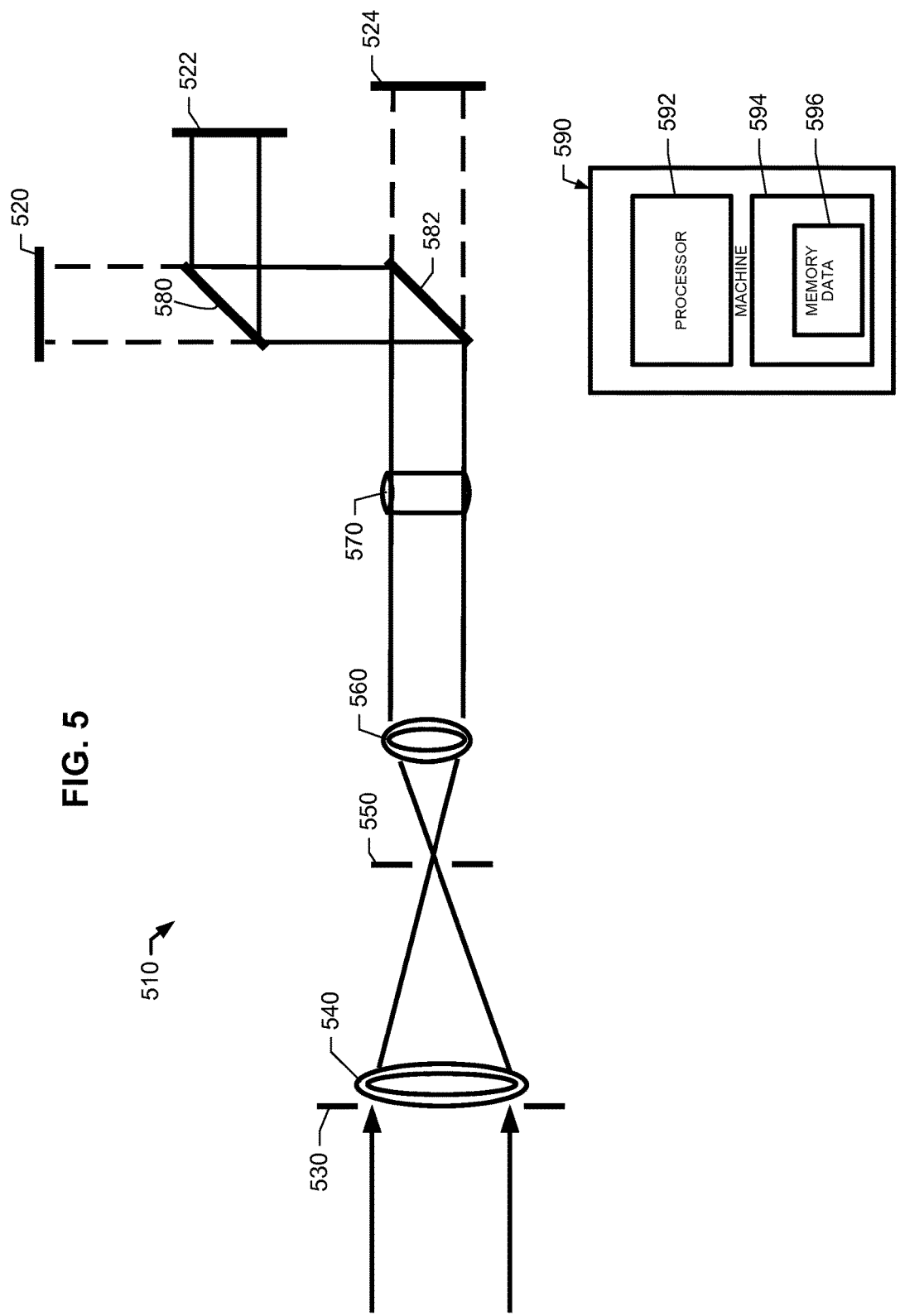
FIG. 5 is an illustration of a system for collecting radiation data from an object and processing the data to produce a multi-temperature profile for the object.

Reference is now made to FIG. 5, which illustrates an example of a system 510 for collecting radiation data from an object. The spectral data is collected from a "spot" on the object. The system 510 of FIG. 5 includes first, second and third thermal radiation sensors 520, 522 and 524. These sensors 520, 522 and 524 provide direct values for detected spectral radiation.

The system 510 further includes optics for collecting spectral radiation from a spot on an object, and focusing the spot onto the sensors 520, 522 and 524. Spot size is determined by the combination of sensor size and sensitivity, the optics, and the distance from the sensors 520, 522 and 524 to the object. Generally a larger spot is more desirable than a smaller spot. More energy is collected, which results in a better the signal-to-noise ratio.

The example of FIG. 5 includes the following optics. Radiation is admitted through an aperture stop 530 and focused by a collection lens 540 at a field stop 550. (The field stop 550 ensures that sensor collection area is filled.) Radiation passing through the field stop 550 is collimated by a collimating lens 560, and focused by a cylindrical focusing lens 570. The radiation focused by the lens 570 is then separated into first, second and third bands by optical elements 580 and 582. The first band is impinged onto the first sensor 520 (which is sensitive to wavelengths in the first band), the second band is impinged onto the second sensors 522, (which is sensitive to wavelengths in the second band), and the third band is impinged onto the third sensor 520 (which is sensitive to wavelengths in the third band). There may be overlap between the first, second and third bands.

In some embodiments, a scanning spectral filter may be used instead of multiple sensors. For example, a multi-element sensor may be used with a linear variable filter to obtain the spectrum.

The system 510 further includes a machine 590 such as a computer for processing the spectral data to determine a multi-temperature profile of the object. The machine 590 may include a processor 592, machine-readable memory 594, and data 596 stored in the memory 594. When executed, the data causes the processor 592 to process the sensor data to produce a multi-temperature profile of the object as described above.

Non-contact measurement based on a method herein may be used in manufacturing environments to accurately monitor temperatures during processing. It may also be applied to remote sensing devices to determine temperature profiles of distant objects of interest.

As a first example, the non-contact measurement herein may be applied to low emissivity glass manufacturing involving grades of low emissivity glass with very low yet different emissivity values. These emissivity values may not be known especially at the respective processing temperatures. Even though the emissivity values are not known, the non-contact measurement herein still provides a multi-temperatures profile. Moreover, the profile is accurate so as to maintain tight temperature controls of the glass manufacturing.

As a second example, the non-contact measurement herein may be applied to steel manufacturing. The non-contact measurement herein may be used to monitor temperatures of individual materials, iron ore, lime, coal, and coke to ensure quality. In addition, the non-contact measurement herein may be used to measure maximum processing temperature to prevent damage to critical manufacturing equipment.

As a third example, the non-contact measurement herein may be applied to high temperature processing in refractory lined vessels. The non-contact measurement may be used to detect hot spots. The hot spots may indicate where the refractory lining is worn away or damaged.

Another example is thermal monitoring systems in plastic extrusion and plastic thermoforming processes. Still another example is plasma temperature measurements.

The invention claimed is:

1. A method of determining a multi-temperature profile of an object from spectral data collected from the object, the spectral data covering a plurality of wavelengths, the method comprising:
    collecting the spectral data from the object using at least one thermal sensor configured to capture spectral data over a plurality of wavelengths;
    communicating the spectral data to a computer programmed to:
        (a) initially set a current value for residual radiation to total radiation collected from the object;
        (b) identify a black body profile that best fits the spectral data over the plurality of wavelengths;
        (c) infer a temperature from the identified profile;
        (d) update the current value for residual radiation by subtracting an amount of radiation corresponding to the identified black body profile; and
        (e) return to (b) until the current value for residual radiation reaches a termination criterion; and
    outputting each temperature inferred at (c) to a display.

2. The method of claim 1, wherein the identified profile indicates spectral radiance per unit area; and wherein the amount of radiation corresponding to the black body profile is determined by computing a product of the spectral radiance per unit area and an area-emissivity factor.

3. The method of claim 1, wherein the termination criterion is satisfied when the current value for residual radiation reaches a noise level.

4. The method of claim 1, wherein a statistical approach is taken towards identifying a black body profile.

5. The method of claim 4, wherein identifying a black body profile includes:
    computing a black body profile for each of a plurality of different temperatures for each of the plurality of wavelengths; and
    selecting one of the profiles that best fits the spectral data at the given wavelength.

6. The method of claim 5, wherein selecting one of the profiles includes:
    computing a ratio of residual radiation to black body radiation for each of the temperatures; and
    selecting the profile corresponding to a global minimum of ratio standard deviation.

7. The method of claim 1, wherein the spectral data covers at least ten discrete wavelengths.

8. The method of claim 1, further comprising not processing spectral data corresponding to wavelengths that are not useful.

9. The method of claim 1, further comprising using a plurality of sensors including a thermal sensor and optics for collecting the spectral data from a spot on the object.

10. An article comprising non-transitory computer-readable memory encoded with data for causing a processor to determine a multi-temperature profile of the object according to the method of claim 1.

11. A method of determining multiple temperatures of an object from spectral data covering a plurality of wavelengths, the method comprising:
   collecting the spectral data from the object using at least one thermal sensor configured to capture spectral data over a plurality of wavelengths;
   communicating the spectral data to a computer programmed to:
      initially set a current value for residual radiation to total radiation in the spectral data;
      compute a black body profile for each of a plurality of temperatures for each one of the wavelengths;
      select one of the profiles that best fits the spectral data;
      infer a temperature from the selected profile;
      update the current value for residual radiation by subtracting an amount of radiation contributed by the selected profile; and
      return to computing the black body profile for each of a new plurality of temperatures, the new plurality not including any inferred temperature; and
   outputting each temperature inferred from the selected profile to a display.

12. Apparatus for determining a multi-temperature profile of an object, the apparatus comprising:
   at least one thermal sensor for capturing spectral data of the object over a plurality of wavelengths;
   a processor programmed to:
      initially assign a current value for residual radiation;
      identify a black body profile that best fits the spectral data of the object over the plurality of wavelengths;
      infer a temperature of the object from the identified black body profile;
      update the current value for residual radiation by subtracting an amount of radiation corresponding to the identified profile; and
      return to identifying a black body profile for another temperature until the current value for residual radiation reaches a termination criterion; and
   a display coupled to the processor and configured to display each temperature inferred from the identified black body profile.

13. The apparatus of claim 12, further comprising optics for collecting spectral radiation from a spot on an object, and focusing the spot onto the sensors.

14. The apparatus of claim 12, wherein the processor is programmed to initially assign the current value for residual radiation as total radiation collected by the at least one sensor.

15. The apparatus of claim 12, wherein the processor is programmed to infer a temperature from the identified profile.

16. The apparatus of claim 12, wherein the identified profile indicates spectral radiance per unit area; and wherein the processor is programmed to determine the amount of radiation corresponding to the identified profile by computing a product of the spectral radiance per unit area and an area-emissivity factor.

17. The apparatus of claim 12, wherein the processor is programmed to use statistics to identify a black body profile.

18. The apparatus of claim 12, wherein the at least one sensor includes a plurality of sensors that are each sensitive to at least one of ten discrete wavelengths.

* * * * *